United States Patent
Curtis (10) Patent No.: US 9,311,364 B2
(45) Date of Patent: Apr. 12, 2016

(54) SYSTEM AND METHOD FOR GENERATING DYNAMICALLY FILTERED CONTENT RESULTS, INCLUDING FOR AUDIO AND/OR VIDEO CHANNELS

(71) Applicant: PORTO TECHNOLOGY, LLC, Wilmington, NC (US)

(72) Inventor: Scott Curtis, Durham, NC (US)

(73) Assignee: Porto Technology, LLC, Wilmington, DE (US)

(*) Notice: Subject to any disclaimer, the term of this patent is extended or adjusted under 35 U.S.C. 154(b) by 0 days.

(21) Appl. No.: 14/690,686

(22) Filed: Apr. 20, 2015

(65) Prior Publication Data

US 2015/0227525 A1 Aug. 13, 2015

Related U.S. Application Data

(63) Continuation of application No. 11/961,679, filed on Dec. 20, 2007, now Pat. No. 9,015,147.

(51) Int. Cl.
*G06F 17/30* (2006.01)
*G06F 7/00* (2006.01)

(52) U.S. Cl.
CPC ...... *G06F 17/3053* (2013.01); *G06F 17/30554* (2013.01); *G06F 17/30749* (2013.01);
(Continued)

(58) Field of Classification Search
CPC ............... G06F 17/30241; G06F 17/30997; G06F 17/3237
USPC .................................. 707/721, 723
See application file for complete search history.

(56) References Cited

U.S. PATENT DOCUMENTS 3,291,919 A 12/1966 Robitaille
4,682,370 A 7/1987 Matthews
(Continued)

FOREIGN PATENT DOCUMENTS

EP 1686497 8/2006
GB 2306869 5/1997
(Continued)

OTHER PUBLICATIONS

"About Intermind's Channel Communications Patents," downloaded from <http://www.intermind.com/materials/patent_desc.html> on Feb. 27, 1998, 5 pages.
(Continued)

*Primary Examiner* — Pavan Mamillapalli (57) ABSTRACT

A system and method for allowing a user to more effectively generate focused content results, including audio and/or video content is described. Content is dynamically filtered to generate content results in response to initial filtering settings or characteristics. The content results are provided to a user. Once the user finds and selects a content result of interest, additional filtering characteristics associated with the selected result are provided to the user as a suggestion for additional filtering. In this manner, the user is made aware of additional filtering settings or characteristics that can be used to focus the search results. Subsequent filter settings and filtering operations can be based on characteristics of previous relevant results in an iterative and dynamic manner. Focused results are more likely produced, because additional filtering settings are provided and adjusted according to characteristics of results deemed relevant by the user.

23 Claims, 10 Drawing Sheets

(52) U.S. Cl.
CPC .... *G06F17/30766* (2013.01); *G06F 17/30775* (2013.01); *G06F 17/30817* (2013.01); *G06F 17/30828* (2013.01); *G06F 17/30849* (2013.01)

(56) References Cited

U.S. PATENT DOCUMENTS

| | | |
|---|---|---|
| 4,720,873 A | 1/1988 | Goodman et al. |
| 4,788,675 A | 11/1988 | Jones et al. |
| 4,920,432 A | 4/1990 | Eggers et al. |
| 5,119,188 A | 6/1992 | McCalley et al. |
| 5,127,003 A | 6/1992 | Doll, Jr. et al. |
| 5,129,036 A | 7/1992 | Dean et al. |
| 5,132,992 A | 7/1992 | Yurt et al. |
| 5,134,719 A | 7/1992 | Mankovitz |
| 5,168,481 A | 12/1992 | Culbertson et al. |
| 5,305,438 A | 4/1994 | MacKay et al. |
| 5,351,276 A | 9/1994 | Doll, Jr. et al. |
| 5,396,417 A | 3/1995 | Burks et al. |
| 5,414,455 A | 5/1995 | Hooper et al. |
| 5,442,701 A | 8/1995 | Guillou et al. |
| 5,455,570 A | 10/1995 | Cook et al. |
| 5,526,284 A | 6/1996 | Mankovitz |
| 5,539,635 A | 7/1996 | Larson, Jr. |
| 5,557,541 A | 9/1996 | Schulhof et al. |
| 5,572,442 A | 11/1996 | Schulhof et al. |
| 5,592,511 A | 1/1997 | Schoen et al. |
| 5,617,565 A | 4/1997 | Augenbraun et al. |
| 5,629,867 A | 5/1997 | Goldman |
| 5,706,427 A | 1/1998 | Tabuki |
| 5,721,827 A | 2/1998 | Logan et al. |
| 5,732,216 A | 3/1998 | Logan et al. |
| 5,734,893 A | 3/1998 | Li et al. |
| 5,758,257 A | 5/1998 | Herz et al. |
| 5,790,935 A | 8/1998 | Payton |
| 5,809,246 A | 9/1998 | Goldman |
| 5,815,662 A | 9/1998 | Ong |
| 5,818,510 A | 10/1998 | Cobbley et al. |
| 5,819,160 A | 10/1998 | Foladare et al. |
| 5,819,273 A | 10/1998 | Vora et al. |
| 5,852,610 A | 12/1998 | Olaniyan |
| 5,855,015 A | 12/1998 | Shoham |
| 5,857,149 A | 1/1999 | Suzuki |
| 5,864,682 A | 1/1999 | Porter et al. |
| 5,907,831 A | 5/1999 | Lotvin et al. |
| 5,920,856 A | 7/1999 | Syeda-Mahmood |
| 5,926,624 A | 7/1999 | Katz et al. |
| 5,943,422 A | 8/1999 | Van Wie et al. |
| 5,949,492 A | 9/1999 | Mankovitz |
| 5,953,005 A | 9/1999 | Liu |
| 5,956,716 A | 9/1999 | Kenner et al. |
| 5,973,724 A | 10/1999 | Riddle |
| 5,974,441 A | 10/1999 | Rogers et al. |
| 5,983,200 A | 11/1999 | Slotznick |
| 5,983,218 A | 11/1999 | Syeda-Mahmood |
| 5,986,692 A | 11/1999 | Logan et al. |
| 6,006,225 A * | 12/1999 | Bowman et al. ....... 707/999.005 |
| 6,009,422 A | 12/1999 | Ciccarelli |
| 6,014,569 A | 1/2000 | Bottum |
| 6,018,768 A | 1/2000 | Ullman et al. |
| 6,029,165 A | 2/2000 | Gable |
| 6,038,591 A | 3/2000 | Wolfe et al. |
| 6,055,566 A | 4/2000 | Kikinis |
| 6,060,997 A | 5/2000 | Taubenheim et al. |
| 6,067,562 A | 5/2000 | Goldman |
| 6,081,780 A | 6/2000 | Lumelsky |
| 6,081,830 A | 6/2000 | Schindler |
| 6,088,455 A | 7/2000 | Logan et al. |
| 6,088,722 A | 7/2000 | Herz et al. |
| 6,093,880 A | 7/2000 | Arnalds |
| 6,108,686 A | 8/2000 | Williams, Jr. |
| 6,122,757 A | 9/2000 | Kelley |
| 6,125,387 A | 9/2000 | Simonoff et al. |
| 6,128,663 A | 10/2000 | Thomas |
| 6,144,375 A | 11/2000 | Jain et al. |
| 6,161,142 A | 12/2000 | Wolfe et al. |
| 6,167,393 A | 12/2000 | Davis, III et al. |
| 6,169,573 B1 | 1/2001 | Sampath-Kumar et al. |
| 6,182,128 B1 | 1/2001 | Kelkar et al. |
| 6,199,076 B1 | 3/2001 | Logan et al. |
| 6,223,210 B1 | 4/2001 | Hickey |
| 6,226,672 B1 | 5/2001 | DeMartin et al. |
| 6,229,621 B1 | 5/2001 | Kulakowski et al. |
| 6,233,682 B1 | 5/2001 | Fritsch |
| 6,246,672 B1 | 6/2001 | Lumelsky |
| 6,248,946 B1 | 6/2001 | Dwek |
| 6,253,069 B1 | 6/2001 | Mankovitz |
| 6,263,507 B1 | 7/2001 | Ahmad et al. |
| 6,289,165 B1 | 9/2001 | Abecassis |
| 6,292,786 B1 | 9/2001 | Deaton et al. |
| 6,295,555 B1 | 9/2001 | Goldman |
| 6,311,194 B1 | 10/2001 | Sheth et al. |
| 6,314,094 B1 | 11/2001 | Boys |
| 6,317,784 B1 | 11/2001 | Mackintosh et al. |
| 6,334,127 B1 | 12/2001 | Bieganski et al. |
| 6,335,927 B1 | 1/2002 | Elliott et al. |
| 6,338,044 B1 | 1/2002 | Cook et al. |
| 6,339,693 B1 | 1/2002 | Chan |
| 6,344,607 B2 | 2/2002 | Cliff |
| 6,345,289 B1 | 2/2002 | Lotspiech et al. |
| 6,349,329 B1 | 2/2002 | Mackintosh et al. |
| 6,349,339 B1 | 2/2002 | Williams |
| 6,351,733 B1 | 2/2002 | Saunders et al. |
| 6,377,782 B1 | 4/2002 | Bishop et al. |
| 6,385,596 B1 | 5/2002 | Wiser et al. |
| 6,389,467 B1 | 5/2002 | Eyal |
| 6,411,992 B1 | 6/2002 | Srinivasan et al. |
| 6,415,282 B1 * | 7/2002 | Mukherjea et al. ........... 707/737 |
| 6,438,579 B1 | 8/2002 | Hosken |
| 6,473,792 B1 | 10/2002 | Yavitz et al. |
| 6,477,707 B1 | 11/2002 | King et al. |
| 6,484,199 B2 | 11/2002 | Eyal |
| 6,487,390 B1 | 11/2002 | Virine et al. |
| 6,496,802 B1 | 12/2002 | van Zoest et al. |
| 6,502,194 B1 | 12/2002 | Berman et al. |
| 6,505,123 B1 | 1/2003 | Root et al. |
| 6,519,648 B1 | 2/2003 | Eyal |
| 6,546,555 B1 | 4/2003 | Hjelsvold et al. |
| 6,560,651 B2 | 5/2003 | Katz et al. |
| 6,581,103 B1 | 6/2003 | Dengler |
| 6,587,127 B1 | 7/2003 | Leeke et al. |
| 6,600,898 B1 | 7/2003 | De Bonet et al. |
| 6,609,096 B1 | 8/2003 | De Bonet et al. |
| 6,615,039 B1 | 9/2003 | Eldering |
| 6,628,928 B1 | 9/2003 | Crosby et al. |
| 6,662,231 B1 | 12/2003 | Drosset et al. |
| 6,670,537 B2 | 12/2003 | Hughes et al. |
| 6,684,249 B1 | 1/2004 | Frerichs et al. |
| 6,697,824 B1 | 2/2004 | Bowman-Amuah |
| 6,701,355 B1 | 3/2004 | Brandt et al. |
| 6,708,203 B1 | 3/2004 | Makar et al. |
| 6,711,622 B1 | 3/2004 | Fuller et al. |
| 6,721,741 B1 | 4/2004 | Eyal et al. |
| 6,725,275 B2 | 4/2004 | Eyal |
| 6,735,628 B2 | 5/2004 | Eyal |
| 6,741,869 B1 | 5/2004 | Lehr |
| 6,748,237 B1 | 6/2004 | Bates et al. |
| 6,772,127 B2 | 8/2004 | Saunders et al. |
| 6,792,470 B2 | 9/2004 | Hakenberg et al. |
| 6,793,142 B2 | 9/2004 | Yap |
| 6,823,225 B1 | 11/2004 | Sass |
| 6,879,963 B1 | 4/2005 | Rosenberg |
| 6,882,641 B1 | 4/2005 | Gallick et al. |
| 6,925,489 B1 | 8/2005 | Curtin |
| 6,981,040 B1 | 12/2005 | Konig et al. |
| 6,985,694 B1 | 1/2006 | De Bonet et al. |
| 6,996,186 B2 | 2/2006 | Ngai et al. |
| 6,999,783 B2 | 2/2006 | Toyryla et al |
| 7,010,263 B1 | 3/2006 | Patsiokas |
| 7,010,537 B2 | 3/2006 | Eyal et al. |
| 7,010,613 B2 | 3/2006 | Connor |
| 7,028,082 B1 | 4/2006 | Rosenberg et al. |
| 7,031,931 B1 | 4/2006 | Meyers |
| 7,035,871 B2 | 4/2006 | Hunt et al. |
| 7,058,694 B1 | 6/2006 | De Bonet et al. |

(56) References Cited

U.S. PATENT DOCUMENTS

| | | | |
|---|---|---|---|
| 7,061,482 B2 | 6/2006 | Ferris |
| 7,072,309 B2 | 7/2006 | Xie et al. |
| 7,079,807 B1 | 7/2006 | Daum et al. |
| 7,102,067 B2 | 9/2006 | Gang et al. |
| 7,133,924 B1 | 11/2006 | Rosenberg et al. |
| 7,139,770 B2 | 11/2006 | Nakase et al. |
| 7,149,983 B1 | 12/2006 | Robertson et al. |
| 7,171,491 B1 | 1/2007 | O'Toole et al. |
| 7,203,838 B1 | 4/2007 | Glazer et al. |
| 7,206,838 B2 | 4/2007 | Boyd et al. |
| 7,277,955 B2 | 10/2007 | Elliott |
| 7,343,141 B2 | 3/2008 | Ellis et al. |
| 7,468,934 B1 | 12/2008 | Janik |
| 7,469,283 B2 | 12/2008 | Eyal et al. |
| 7,519,621 B2 | 4/2009 | Harik |
| 7,577,665 B2* | 8/2009 | Ramer et al. | 707/999.01 |
| 7,680,959 B2 | 3/2010 | Svendsen |
| 7,711,838 B1 | 5/2010 | Boulter et al. |
| 7,765,192 B2 | 7/2010 | Svendsen |
| 7,783,722 B1 | 8/2010 | Rosenberg et al. |
| 7,797,272 B2 | 9/2010 | Picker et al. |
| 7,797,321 B2 | 9/2010 | Martin et al. |
| 7,827,110 B1 | 11/2010 | Wieder |
| 7,827,236 B2 | 11/2010 | Ferris |
| 7,840,691 B1 | 11/2010 | De Bonet et al. |
| 7,853,622 B1 | 12/2010 | Baluja et al. |
| 7,856,485 B2 | 12/2010 | Prager et al. |
| 7,870,088 B1 | 1/2011 | Chen et al. |
| 7,904,505 B2 | 3/2011 | Rakers et al. |
| 7,917,645 B2 | 3/2011 | Ikezoye et al. |
| 7,917,932 B2 | 3/2011 | Krikorian |
| 7,926,085 B2 | 4/2011 | Del Beccaro et al. |
| 8,045,952 B2 | 10/2011 | Qureshey et al. |
| 8,050,652 B2 | 11/2011 | Qureshey et al. |
| 2001/0025259 A1 | 9/2001 | Rouchon |
| 2001/0051852 A1 | 12/2001 | Sundaravel et al. |
| 2002/0002039 A1 | 1/2002 | Qureshey et al. |
| 2002/0010759 A1 | 1/2002 | Hitson et al. |
| 2002/0023084 A1 | 2/2002 | Eyal et al. |
| 2002/0023270 A1 | 2/2002 | Thomas et al. |
| 2002/0035616 A1 | 3/2002 | Diamond et al. |
| 2002/0053078 A1 | 5/2002 | Holtz et al. |
| 2002/0072326 A1 | 6/2002 | Qureshey et al. |
| 2002/0116082 A1 | 8/2002 | Gudorf |
| 2002/0116476 A1 | 8/2002 | Eyal et al. |
| 2002/0161858 A1 | 10/2002 | Goldman |
| 2002/0165912 A1 | 11/2002 | Wenocur et al. |
| 2002/0183059 A1 | 12/2002 | Noreen et al. |
| 2002/0199001 A1 | 12/2002 | Wenocur et al. |
| 2003/0018799 A1 | 1/2003 | Eyal |
| 2003/0033420 A1 | 2/2003 | Eyal et al. |
| 2003/0041110 A1 | 2/2003 | Wenocur et al. |
| 2003/0088479 A1 | 5/2003 | Wooten et al. |
| 2003/0103644 A1 | 6/2003 | Klayh |
| 2003/0137531 A1 | 7/2003 | Katinsky et al. |
| 2003/0177113 A1* | 9/2003 | Wakita | 707/3 |
| 2004/0006634 A1 | 1/2004 | Ferris |
| 2004/0019497 A1 | 1/2004 | Volk et al. |
| 2004/0186733 A1 | 9/2004 | Loomis et al. |
| 2004/0199494 A1 | 10/2004 | Bhatt |
| 2004/0255340 A1 | 12/2004 | Logan |
| 2005/0021470 A1 | 1/2005 | Martin et al. |
| 2005/0044561 A1 | 2/2005 | McDonald |
| 2005/0198233 A1 | 9/2005 | Manchester et al. |
| 2005/0278380 A1 | 12/2005 | Ferris |
| 2006/0026147 A1 | 2/2006 | Cone et al. |
| 2006/0072724 A1 | 4/2006 | Cohen et al. |
| 2006/0101003 A1 | 5/2006 | Carson et al. |
| 2006/0143236 A1 | 6/2006 | Wu |
| 2006/0171395 A1 | 8/2006 | Deshpande |
| 2006/0195442 A1 | 8/2006 | Cone et al. |
| 2006/0288074 A1 | 12/2006 | Rosenberg |
| 2007/0038995 A1 | 2/2007 | Boyle et al. |
| 2007/0061301 A1* | 3/2007 | Ramer et al. | 707/3 |
| 2007/0078660 A1 | 4/2007 | Ferris |
| 2007/0088804 A1 | 4/2007 | Qureshey et al. |
| 2007/0089132 A1 | 4/2007 | Qureshey et al. |
| 2007/0089135 A1 | 4/2007 | Qureshey et al. |
| 2007/0156647 A1 | 7/2007 | Shen et al. |
| 2007/0156897 A1 | 7/2007 | Lim |
| 2007/0180063 A1 | 8/2007 | Qureshey et al. |
| 2007/0265979 A1 | 11/2007 | Hangartner |
| 2007/0266031 A1 | 11/2007 | Adams et al. |
| 2007/0282949 A1 | 12/2007 | Fischer et al. |
| 2007/0283268 A1 | 12/2007 | Berger et al. |
| 2007/0286169 A1 | 12/2007 | Roman |
| 2008/0016205 A1 | 1/2008 | Svendsen |
| 2008/0031433 A1 | 2/2008 | Sapp et al. |
| 2008/0052380 A1 | 2/2008 | Morita et al. |
| 2008/0085769 A1 | 4/2008 | Lutnick et al. |
| 2008/0208820 A1 | 8/2008 | Usey et al. |
| 2008/0209013 A1 | 8/2008 | Weel |
| 2008/0243733 A1 | 10/2008 | Black |
| 2008/0249870 A1 | 10/2008 | Angell et al. |
| 2009/0013347 A1 | 1/2009 | Ahanger et al. |
| 2009/0061763 A1 | 3/2009 | Dillon et al. |
| 2009/0063645 A1 | 3/2009 | Casey et al. |
| 2009/0064029 A1 | 3/2009 | Corkran et al. |
| 2009/0070267 A9 | 3/2009 | Hangartner |
| 2009/0077041 A1 | 3/2009 | Eyal et al. |
| 2009/0093300 A1 | 4/2009 | Lutnick et al. |
| 2009/0158146 A1 | 6/2009 | Curtis et al. |
| 2010/0185732 A1 | 7/2010 | Hyman |
| 2011/0016483 A1 | 1/2011 | Opdycke |
| 2011/0034121 A1 | 2/2011 | Ng et al. |
| 2012/0042094 A1 | 2/2012 | Qureshey et al. |
| 2012/0042337 A1 | 2/2012 | De Bonet et al. |
| 2012/0143729 A1 | 6/2012 | Qureshey et al. |

FOREIGN PATENT DOCUMENTS

| | | |
|---|---|---|
| WO | WO 97/26601 | 7/1997 |
| WO | WO 2007/041369 | 4/2007 |
| WO | WO 2007/041370 | 4/2007 |

OTHER PUBLICATIONS

"About.com: http://quintura.com/," at <http://websearch.about.com/gi/dynamic/offisite.htm?zi=1/XJ&sdn=web...f=10&su=p284.8.150.ip_&tt=13&bt=0&bts=0&zu=http%3A//quintura.com/>, copyright 2007, Quintura Inc., printed Oct. 17, 2007, 2 pages.

Lingnau et al., "An HTTP-based Infrastructure for Mobile Agents," at <http://www.w3.org/Conferences/WWW4/Papers/150/>, 1995, pp. 1-15, printed Dec. 20, 1999, 15 pages.

"anthony.liekens.net >> Music >> Cloud," at <http://anthony.liekens.net/index.php/Music/Cloud>, page last modified on Apr. 12, 2007, copyright 2000-2006, Anthony Liekens, printed Oct. 17, 2007, 4 pages.

"AOL Music Now," at <http://web.archive.org/web/20060508184531/aol.musicnow.com/az/home.jhtml?_requesti...>, copyright 2006, AOL Music Now LLC, printed Nov. 16, 2007, 1 page.

"Apple—iPod + iTunes," at <http://www.apple.com/itunes/>, copyright 2007 by Paramount Pictures, printed Feb. 7, 2007, 2 pages.

Aguilera, M.K. and Strom, R.E., "Efficient Atomic Broadcast Using Deterministic Merge," Proceedings of ACM Symposium on Principles of Distributed Computing (PODC), Jul. 16-19, 2000, copyright 2000, ACM, New York, New York, 10 pages.

Huhn, Mary, "Fed Up With Radio? Create Your Own Online Station," New York Post, at <http://pqasb.pqarchiver.com/nypost/access/68457933.html?FMT=FT&di...>, Nov. 22, 1998, printed Oct. 13, 2009, 2 pages.

"Frequently Asked Questions about Intermind's Patents," downloaded from <http://www.intermind.com/materials/patent_faq.html> on Feb. 27, 1998, 9 pages.

Kaplan, Marc A., "IBM Cryptolopes TM, SuperDistribution and Digital Rights Management," found at <http://www.research.ibm.com/people/k/kaplan/cryptolope-docs/crypap.html> from the Internet Archive, copyright Dec. 30, 1996, IBM Corporation, printed Mar. 15, 2000, 7 pages.

(56) References Cited

OTHER PUBLICATIONS

Krigel, Beth Lipton, "Imagine Radio spinning off," CNET News, at <http://news.cnet.com/Imagine-Radio-spinning-off/2100-1033_3-213613.html>, Jul. 22, 1998, printed Oct. 13, 2009, 3 pages.

"InferNote is an exploration tool for your music collection," at <http://www.itweaks.com/infdoc/index.html>, copyright 2004, otherslikeyou.com Inc., printed Feb. 7, 2007, 13 pages.

Egyhazy et al., "Intelligent Web Search Agents," at <http://csgrad.cs.vt.edu/~tplunket/article.html>, pp. 1-23, printed Dec. 20, 1999, 23 pages.

"Intermind Announces Approval of First Patent Application," dated Oct. 7, 1997, downloaded from <http://www.intermind.com/inside/press_rel/100797_allow.html>, 3 pages.

Lehmann-Haupt, Rachel, "Library/Internet Radio; Listeners Take on Role of the Deejay," The New York Times, at <http://www.nytimes.com/1998/11/05/technology/library-internet-radio-lis . . . >, Nov. 5, 1998, printed Oct. 13, 2009, 2 pages.

Lehmann-Haupt, Rachel, "Library/Internet Radio; On Spinner, Wide Range of Choices," The New York Times, at <http://www.nytimes.com/1998/11/05/technology/library-internet-radio-on-spinner-wide-range-of-choices.html?scp=1&sq=On . . . >, Nov. 5, 1998, printed Oct. 15, 2009, 5 pages.

Lehmann-Haupt, Rachel, "Library/Internet Radio; Web Radio Expands Listening Horizons," The New York Times, at <http://www.nytimes.com/1998/11/05/technology/library-internet-radio-web-radio-expands-listening-horizons.html?scp=2&sq= . . . >, Nov. 5, 1998, printed Oct. 15, 2009, 5 pages.

Boswell, Wendy, "Loading 'Quintura—Search With Quintura, a Tag Cloud Search Engine'," at <http://websearch.about.com/od/dailywebsearchtips/qt/dnt0830.htm?p=1>, copyright 2007, About.com, Inc., printed Oct. 17, 2007, 1 page.

"Master's Projects of the KR&R Group," Faculty of Sciences, Vrije Universiteit, Amsterdam, URL unknown, publication date unknown, obtained on or prior to Apr. 22, 2009, 7 pages.

Henry, Alan, "MixxMaker: The Mix Tape Goes Online," Jan. 18, 2008, AppScout, found at <http://appscout.pcmag.com/crazy-start-ups-vc-time/276029-mixxmaker-the-mix-tape-goes-online#fbid=DfUZtDa46ye>, printed Nov. 15, 2011, 4 pages.

"Music Artist Cloud," at <http://artistcloud.camaris.be/>, copyright 2007, mac, printed Oct. 17, 2007, 2 pages.

"FAQ," at <http://blog.pandora.com/faq/>, copyright 2005-2006, Pandora Media, Inc., printed Aug. 8, 2006, 20 pages.

"Pandora—Frequently Asked Questions," from <http:www.pandora.com>, obtained on or prior to Apr. 22, 2009, copyright 2005-2009, Pandora Media, Inc., 48 pages.

"Pandora Internet Radio—Find New Music, Listen to Free Web Radio," at <http://www.pandora.com/>, copyright 2005-2007, Pandora Media, Inc., printed Feb. 7, 2007, 1 page.

"Pandora Radio—Listen to Free Internet Radio, Find New Music—The Music Genome Project," at <http://www.pandora.com/mgp>, copyright 2005-2007, Pandora Media, Inc., printed Oct. 26, 2007, 1 page.

International Search Report for PCT/GB01/03069 mailed Oct. 11, 2002, 3 pages.

Merkel, Oliver et al., "Protecting VoD the Easier Way," Proceedings of the sixth ACM International Conference on Multimedia, Sep. 13-16, 1998, Bristol, United Kingdom, 1998, pp. 21-28, 8 pages.

Krigel, Beth Lipton, "Radio features at center of Net law," CNET News, at <http://news.cnet.com/Radio-features-at-center-of-Net-law/2100-1033_3-214752.html>, Aug. 24, 1998, printed Oct. 15, 2009, 2 pages.

Nickell, Joe Ashbrook, "Roll Your Own Radio," at <http://www.wired.com/print/culture/lifestyle/news/1998/08/14706>, Aug. 28, 1998, printed Oct. 13, 2009, 1 page.

Madan, Sameer, "Search the Web without a headache," PC World (India), pp. 40-41, Feb. 1998, printed Dec. 20, 1999, 2 pages.

"Searching and Browsing Radio Time," URL unknown, publication date unknown, obtained on or prior to Apr. 22, 2009, 3 pages.

Lamantia, Joe, "Second Generation Tag Clouds," Feb. 23, 2006, at <http://www.joelamantia.com/blog/archives/ideas/second_generation_tag_clouds.html>, copyright 2006, Joe Lamantia, printed Nov. 29, 2007, 19 pages.

"Start Listening with Last.fm," at <http://www.last.fm/>, date unknown but may date back as early as 2002, 1 page.

"Tag cloud in standalone player—Feedback and Ideas—Last.fm," at <http://www.last.fm/forum/21717/_/333289>, posting dated Oct. 4, 2007, copyright 2002-2007, Last.fm Ltd., printed Oct. 17, 2007, 2 pages.

Hearst, Marti A. et al., "Tag Clouds: Data Analysis Tool or Social Signaller?," Proceedings of the 41st Annual Hawaii International Conference on System Sciences (HICSS 2008), Jan. 7-10, 2008, Waikoloa, Big Island, Hawaii, p. 160, available from <http://csdl2.computer.org/persagen/DLAbsToc.jsp?resourcePath=/dl/proceedings/&toc=comp/proceedings/hicss/2008/3075/00/3075toc.xml&DOI=10.1109/HICSS.2008.422>, 10 pages.

"TalkStreamLive.com—A Dynamic Directory of Streaming Radio," at <http://www.talkstreamlive.com/aboutus.aspx>, from the Internet Archive, dated Aug. 1, 2008, copyright 2006-2008, 3 pages.

Rouarch, Pierre, "The Cloud Search Beta," at <http://www.itcom3.com/thecloudsearch/aboutthecloudsearch.php>, copyright 2007, Pierre Rouarch, printed Oct. 17, 2007, 2 pages.

Gibbon, John F. et al., "The Use of Network Delay Estimation for Multimedia Data Retrieval," IEEE Journal on Selected Areas in Communications, vol. 14, No. 7, Sep. 1996, pp. 1376-1387, 12 pages.

Hochmair, H.H. et al., "User Interface Design for Semantic Query Expansion in Geo-data Repositories," Angewandte Geoinformatik 2006—Beitrage zum 18, AGIT-Symposium Salzburg: Heidelberg: Wichmann, 2006, 10 pages.

Smith, Patricia, "WebCompass Takes Web Searching in the Right Direction," Seybold Report on Desktop Publishing, vol. 10, No. 10, pp. 1-9, found at <http://www.seyboldseminars.com/seybold_report/reports/D1010001.htm>, copyright 1996, Seybold Publications Inc., 9 pages.

"Welcome to Internet Talk Radio from Talkzone.com," at <http://www.talkzone.com/> from the Internet Archive, dated Jul. 19, 2008, copyright 2007-2008, Syndication Networks Corp., 2 pages.

"What is BlogTalkRadio," at <http://www.blogtalkradio.com/whatis.aspx> from the Internet Archive, dated Feb. 28, 2009, copyright 2009, appears that it may have existed in 2008, BlogTalkRadio.com, 2 pages.

"YouTube—Broadcast Yourself.," at <http://www.youtube.com/>, copyright 2007, YouTube, LLC, printed Oct. 26, 2007, 2 pages.

* cited by examiner

| GENRE | RANK |
|---|---|
| ALTERNATIVE | 3 |
| ELECTRONIC | 2 |
| ⋮ | ⋮ |
| HIP-HOP | 8 |
| ⋮ | ⋮ |
| INSTRUMENTAL/WORLD | 2 |
| ⋮ | ⋮ |
| ROCK | 4 |

| GENRE (146) | SUGGESTIVE ALTERNATIVE GENRES (148) | | | | | | | | |
|---|---|---|---|---|---|---|---|---|---|
| ... | | | | | | | | | |
| PUNK | | NEW WAVE | 8 | PROGRESSIVE | 5 | DISCO | 4 | RAVE | 3 | BLUES | 2 |
| ... | | | | | | | | | |

FIG. 7B

| user | song | artist | genre | decade | time | availability | score |
|---|---|---|---|---|---|---|---|
| hugh | forgotten | linkin park | alternative | 2000s | 3:14 | local | 95 |
| waymen | so what | miles davis | jazz | 1960s | 6:37 | find | 94 |
| gary | dance in my sleep | dave adams | alternative | 1980s | 4:25 | subscription network | 92 |
| waymen | come away with me | norah jones | jazz | 2000s | 4:56 | subscription network | 88 |
| mike | walk the line | johnny cash | country | 1970s | 5:31 | buy/download | 86 |
| hugh | say hey | the tubes | alternative | 1980s | 20:54:24 | local | 86 |
| hugh | you get what you give | new radicals | alternative | 1990s | 4:12:03 | local | 83 |
| hugh | tenderness | general public | new wave | 1980s | 25:32:21 | local | 83 |
| hugh | running with the devil | van halen | rock | 1970s | 12:35:11 | local | 82 |
| gene | rebel yell | billy idol | punk | 1980s | 0:32 | subscription network | 81 |
| gene | beautiful day | u2 | rock | 2000s | 7:54 | local | 79 |
| mike | still lovin you | scorpions | metal | 1980s | 1:03 | subscription network | 76 |
| gene | true | spandau ballet | dance | 1980s | 3:31 | subscription network | 72 |
| gary | heart of the night | poco | rock | 1970s | 0:42 | subscription network | 67 |
| gary | roundabout | yes | rock | 1970s | 6:11 | buy/download | 67 |
| gene | alison | elvis costello | alternative | 1980s | 5:51 | buy/download | 65 |
| gary | run to the hills | iron maiden | metal | 1970s | 7:21 | local | 64 |
| mike | hound dog | elvis presley | rock | 1980s | 6:19 | buy/download | 55 |
| waymen | something more | sugarland | country | 2000s | 0:37 | subscription network | 25 |

SYSTEM AND METHOD FOR GENERATING DYNAMICALLY FILTERED CONTENT RESULTS, INCLUDING FOR AUDIO AND/OR VIDEO CHANNELS

CROSS REFERENCE TO RELATED APPLICATIONS

This application is a continuation of U.S. Pat. No. 9,105,147, filed Dec. 20, 2007, entitled "System And Method For Generating Dynamically Filtered Content Results, Including For Audio And/Or Video Channels, the disclosure of which is hereby incorporated herein by reference in its entirety.

FIELD OF THE INVENTION

The present invention relates to a system and method for generating dynamically filtered content results, including for audio and/or video channels. A user can iteratively select content of interest among the filtered content results to receive suggestions on additional filtering characteristics. The additional filtering characteristics can then be used to redefine the filtering characteristics to provide content results focused on content having characteristics similar to the user's selected content result of interest.

BACKGROUND

In recent years, there has been enormous increase in the amount of digital content available online. As a result, the amount of content downloaded by users has increased. This content includes audio and video content. For example, Apple® iTunes® enables users to legally purchase and download music to personal music devices. Video services exist that allow users to access and download video media. Due to the large amount of content available, searching and filtering technologies have emerged as an important enabler to assist users in navigating large amounts of content to produce and manage subsets of available content. These technologies are desired to allow users to filter content according to the user's desires or interests.

Current filtering technologies can be used to generate content results according to user-defined characteristics or criteria. However, these filtering technologies may be inefficient in sufficiently allowing a user to focus the content results to the user's particular interests or goals. For example, a user may select certain genre tags to generate song results meeting the desired genre. If the results are not sufficiently narrowed to the user's desires or interests, the user may have to change or replace the genre tags to produce new results. The user may have to guess which tag changes or replacements should be made to achieve focused results with no guarantee that more focused results will be produced. The user may have to provide several iterations of different filtering settings or characteristics to finally reach a result set that is sufficiently narrowed to the user's interests. As one can imagine, this can be time consuming and possibly frustrating to a user, especially if the iterations do not provide sufficiently focused results.

Further, the user may not be aware of all available filter settings that can be used to filter content to the desired results. Unknown filter settings may be the ones that would successfully produce the desired focused results. For example, in the iTunes® music classification system, there are over 230 different genre and sub-genre music types. Many users are only familiar with the most popular genre types. However, the most popular types often produce the greatest number of search results and thus provide the least focus. Less commonly known genres may be available to produce the desired focused results.

Thus, a need exists for providing a user the ability to more effectively focus content results to the user's particular desires or interests. The user may be unfamiliar with all available filtering characteristics associated with the content at issue. Thus, the user may not be able to efficiently focus content results without additional suggestions or assistance.

SUMMARY

Embodiments described include systems and methods for allowing a user to more effectively generate focused content results, including but not limited to audio and/or video content results. Content is initially filtered to generate results in response to initial filtering characteristics or settings. The content results are then provided to a user for review. Once the user finds and selects a content result of particular interest, additional filtering characteristics associated with the selected result are provided to the user as suggestions to include as updates to the filtering settings. The suggested filtering characteristics are characteristics that were previously unaccounted for in the filtering settings to produce the results. The updated filter settings can then be used to generate new content results. In this manner, the regeneration of content results is more likely to produce highly relevant and focused results. This is because the results are used to affect the filtering itself. The additional filtering characteristics suggested to the user are characteristics of results deemed relevant by the user, as opposed to traditional filtering engines that only produce results in one direction—from settings to results. With each new generation of content results, additional and previously unaccounted for filtering characteristics of selected results can be continued to be provided to the user. The user can continue to select these additional filtering characteristics to generate new content results in an iterative and dynamic manner until the results are sufficiently focused to the user's desires. It is possible that after a certain number of iterations, the user's selection of results will not provide new previously unaccounted for filtering characteristics. This may also provide the user some degree of comfort that the content results are sufficiently focused.

In one embodiment of the present invention, the content is audio and/or video media. In the context of media, the filter settings or characteristics can be provided in the form of tuner settings. A tuner is provided to generate content results based on the tuner settings. The tuner settings form media channels when used by the tuner to filter content and generate content results. Importance levels may be assigned to the tuner settings to control the dominance of particular settings in tuning. The tuner settings may also be predefined preferences of the user or other preferences assigned by a system. For example, the tuner settings may be based on a scoring system, wherein the scores are determined according to predefined preferences, including those of a user. As the tuner settings are adjusted, media content results are produced. The tuner settings can be stored to create a media channel for later retrieval and content generation. The media channels can be given custom names by the users for recognition and later retrieval for tuning.

The tuner settings can also be provided in the form of one or more tags. The tuner generates content results based on content matching the tags. The tuner settings can include multiple tags of the same type in a tag grouping. A tag grouping is a container that can hold one or more tags of the same type. For example, one type of tag group is "genre." With the genre tag group, a user can deposit one or more genre tags of interest to be used in filtering to produce content results. The tags within a tag grouping can be assigned different levels of importance in filtering. For example, a "rock" tag within a genre tag grouping can be assigned an importance level of 8 out of 10, while a "metal" tag in the same genre tag grouping can be assigned an importance level of 6 out of 10. In this instance, the tuner will focus the content results more towards "rock" genre than "metal" genre.

In addition to or in lieu of the system suggesting additional characteristics associated with a result of interest selected by the user from among the content results, additional filtering characteristics can also provided to the user for inclusion in the tuner settings that are related to the characteristics of the user-selected result. These additional related characteristics may not be accounted for in the filter settings. The system may have stored characteristics that are deemed relevant to those included in the user's selected result. For example, a user-selected result may include a "hard rock" genre tag. In response, the system may suggest "rock" genre as an additional filtering characteristic for a result having a "hard rock" tag. In this example, the system has stored "hard rock" genre as being relevant to "rock" genre.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Embodiments of the present invention include systems and methods for allowing a user to more effectively generate focused content results, including but not limited to audio and/or video content results. Content is initially filtered to generate results in response to initial filtering characteristics or settings. The content results are then provided to a user for review. Once the user finds and selects a content result of particular interest, additional filtering characteristics associated with the selected result are provided to the user as suggestions to include as updates to the filtering settings. The suggested filtering characteristics are characteristics that were previously unaccounted for in the filtering settings to produce the results. The updated filter settings can then be used to generate new content results. In this manner, the regeneration of content results is more likely to produce highly relevant and focused results. This is because the results are used to affect the filtering itself. The additional filtering characteristics suggested to the user are characteristics of results deemed relevant by the user, as opposed to traditional filtering engines that only produce results in one direction—from settings to results. With each new generation of content results, additional and previously unaccounted for filtering characteristics of selected results can be continued to be provided to the user. The user can continue to select these additional filtering characteristics to generate new content results in an iterative and dynamic manner until the results are sufficiently focused to the user's desires. It is possible that after a certain number of iterations, the user's selection of results will not provide new previously unaccounted for filtering characteristics. This may also provide the user some degree of comfort that the content results are sufficiently focused.

In one embodiment of the present invention, the content is audio and/or video media. Filter settings or characteristics are provided in the form of tuner settings. Importance levels or weightings may be assigned to the settings. The tuner settings may also be predefined preferences of the user or other preferences assigned by a system. For example, the tuner settings may be based on a scoring system, wherein the scores are determined according to predefined preferences, including those of a user. As the tuner settings are adjusted, media content results are produced. The tuner settings form media channels. The media channels can be stored for later retrieval and content generation by storing the tuner settings. The media channels can be given custom names by the users for recognition and later retrieval for tuning.

Figure 1:
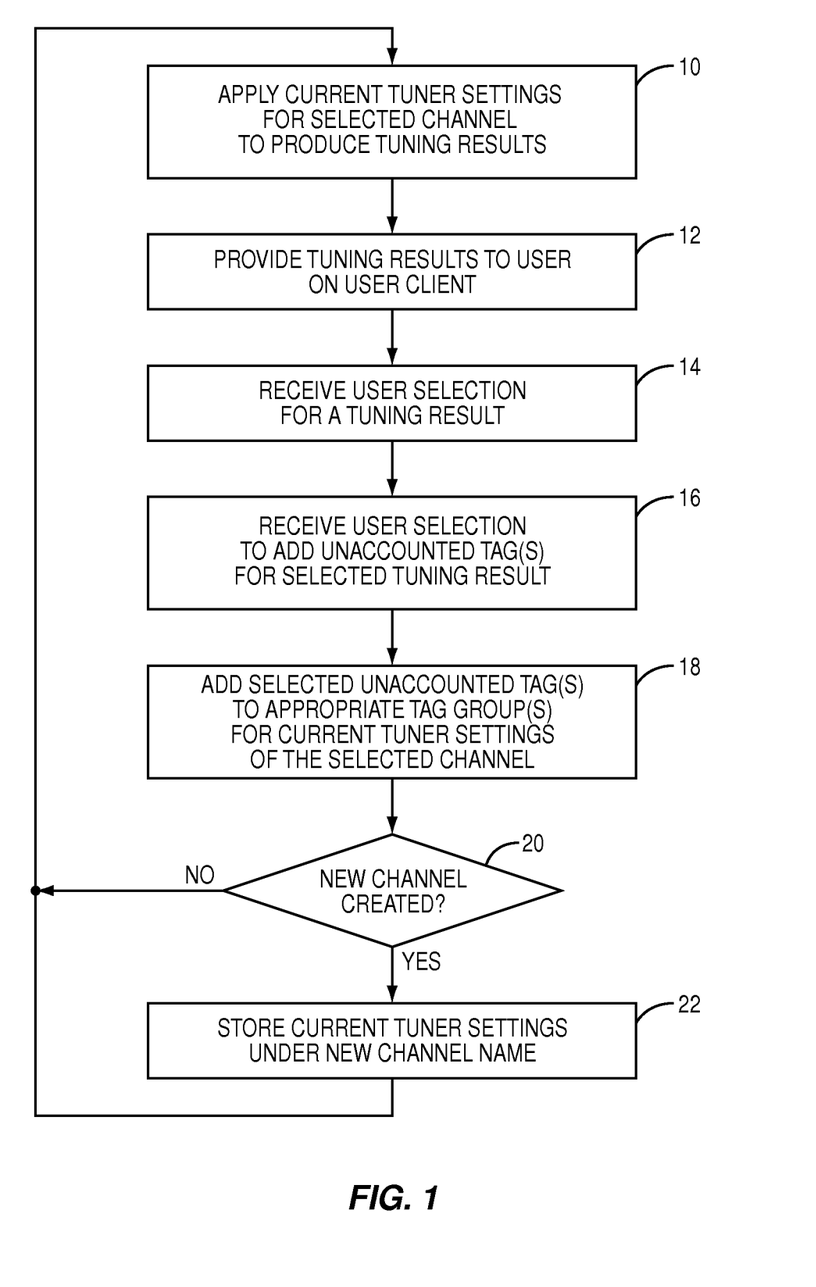
FIG. 1 is a flow chart illustrating an exemplary process for producing filtered content and allowing a user to provide additional characteristics for filtering in an iterative manner based on characteristics of content results, according to one embodiment of the present invention.

In this regard, FIG. 1 is a flowchart illustrating the filtering process according to one embodiment of the present invention. The exemplary steps in FIG. 1 will be discussed in conjunction with user displays in FIGS. 2-7B, which may execute on a client device to provide the content results to a user in response to filtering content. In this embodiment, the content being filtered is audio and/or video media. Filtering in this context is also known as tuning. A tuner may be provided to execute the filter. Filter settings or characteristics in the form of tuner settings are used by the tuner to filter content and provide filtered content results. The tuner settings may be predefined preferences of the user or other preferences assigned by a system. For example, the tuner settings may be based on a scoring system, wherein the scores are determined according to predefined preferences, including those of a user. As the tuner settings are adjusted, the tuning content results are regenerated. The tuner settings form media channels. Different channels may be established and selected by a user wherein each channel has associated tuner settings. Thus, when a particular channel is selected, the tuner settings stored for the channel will be recalled by the tuner to generate the content results.

Figure 2:
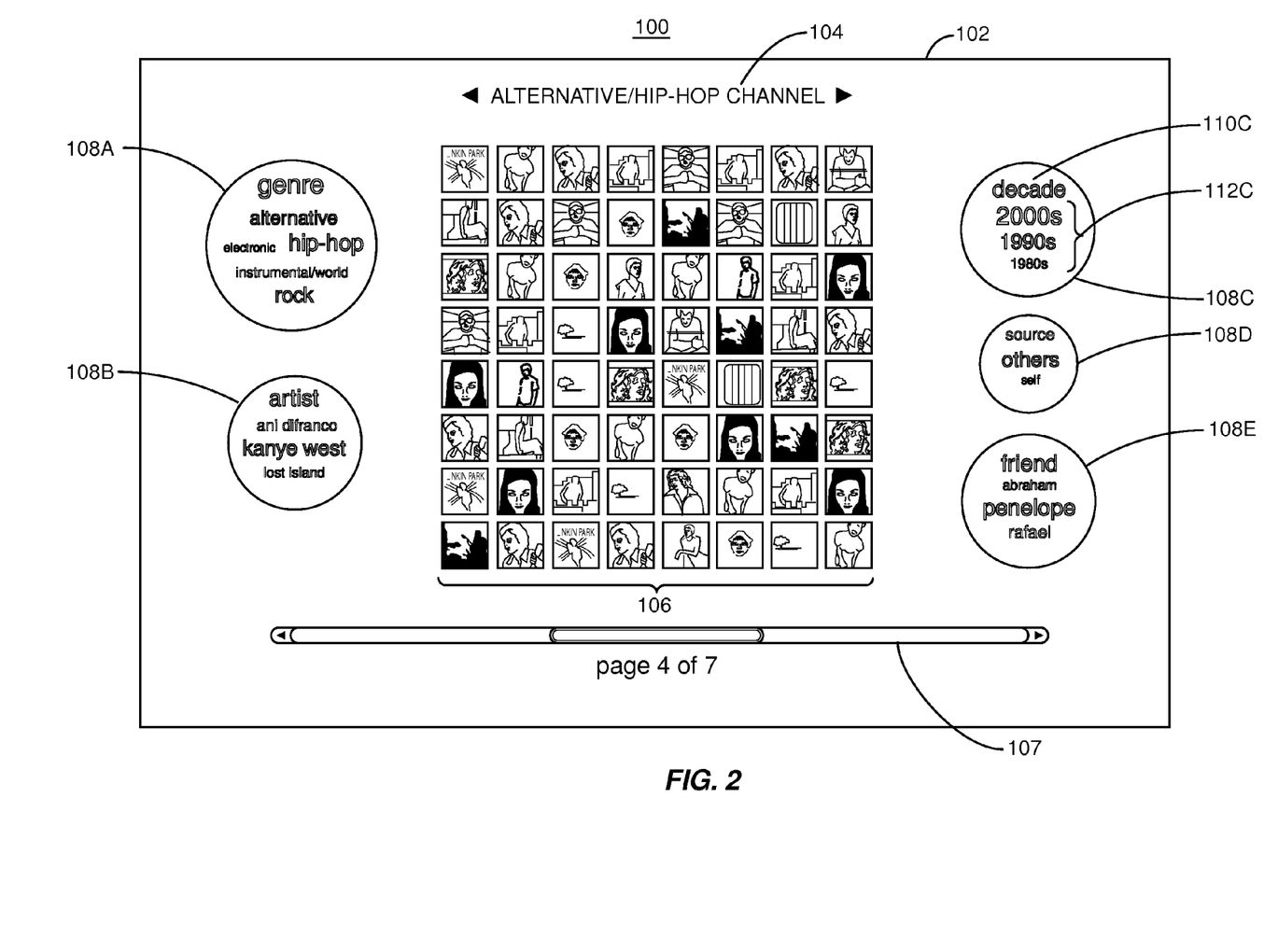
FIG. 2 is a diagram of content results generated according to tags assigned to tag groupings to provide filter settings, according to one embodiment of the present invention.

Turning to FIG. 1, the exemplary process of tuning audio and/or video media starts by applying the current tuner settings for the selected channel to produce the tuning results (step 10). Next, the content results are provided to the user on a user client so that the user can browse or select from among the results (step 12). FIG. 2 illustrates an example of a display 100 that may be displayed by a user client to provide content results to a user. In this example, the content is displayed in a display window 102. The name of a selected channel 104 may be displayed in the display window 102 to show the user which channel is currently being tuned. The content results 106 may be visually displayed to the user, whereby the results are a function of content generated when the tuner settings for the selected channel are applied (e.g. step 10 of FIG. 1). In this example, the content results 106 are album or song media recommendations made to the user from other peer users in a media recommendation system. Such a system is described in co-pending and commonly assigned application Ser. No. 11/484,130 entitled "P2P NETWORK FOR PROVIDING REAL TIME MEDIA RECOMMENDATIONS," which is incorporated herein by reference in its entirety.

In the example illustrated in FIG. 2, the tuner settings in this example are to provide the results 106 in the order of recommendation scores. A scoring system previously scored the recommendations according to preferences or settings. In this example, the results 106 are provided in the form of icons. The song having the highest recommendation score is displayed at the top left icon of the results 106. The next highest scoring recommendation is displayed next in numerically descending order, from left to right, and top to bottom. If more recommendations result from the tuner settings than can be displayed on the display 100 at one time, a paging scroll bar 107 may be provided to allow the user to traverse between different pages to display all the content results 106. Also note that in the spirit of providing a simplified drawing example, the results 106 illustrated in FIG. 2 and later illustrations include duplicate icons. However in practice, each result 106 would typically be unique.

In this example, the filter characteristics or tuner settings associated with the results 106 are tags that are displayed in tag groupings 108A-108E. The tag groupings 108 are designed to hold tags of the same type. For example, the genre tag grouping 108A holds genre type tags. The tag groupings 108 are filled with tags that represent the tags associated with the results 106 in this example. Thus initially, the tag groupings 108 are part of the tuner settings, but they were not set directly by the user in this example. However, the user can adjust the tags in the tag groupings 108 to adjust the tuner settings. In response, the content results 106 will be regenerated by the tuner according to the adjusted tuner settings. Further, the user can adjust the tag groupings 108 themselves to control whether any tags of a certain tag type will be included in the tuner settings, and if so, to what extent.

Figure 3A:
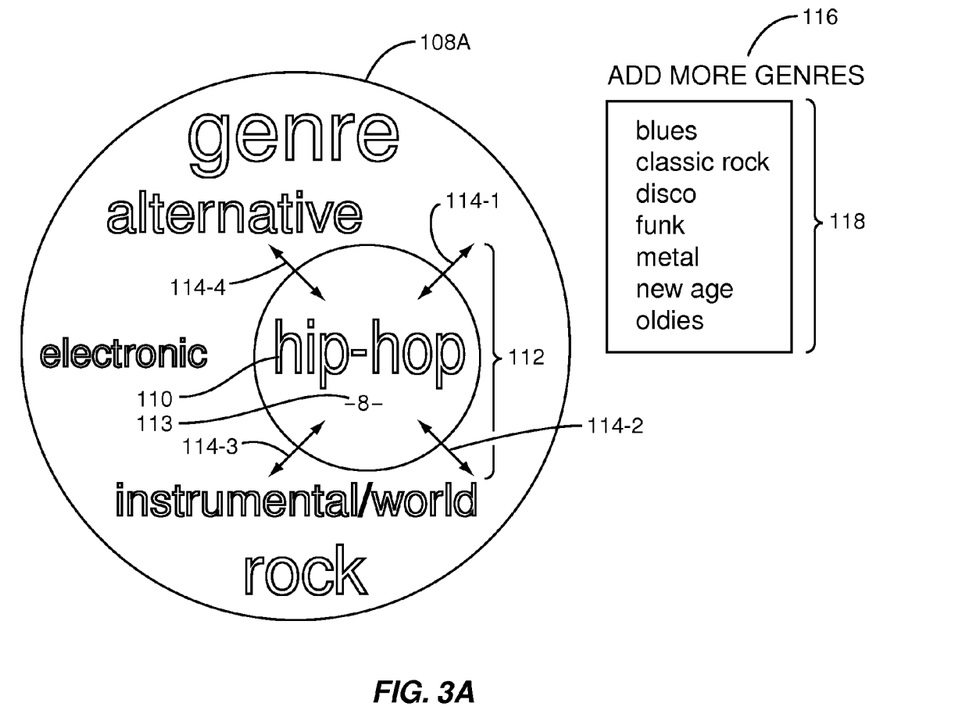
FIG. 3A illustrates an exemplary tag grouping that is adapted to hold desired tags to be used in filter settings according to assigned and adjustable levels of importance, according to one embodiment of the present invention.
Figure 3B:
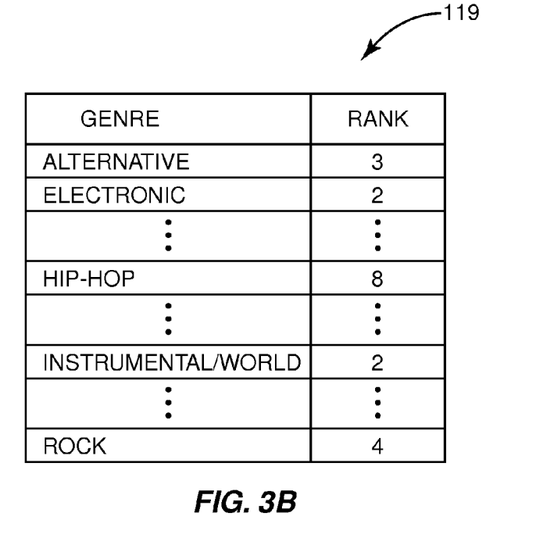
FIG. 3B illustrates a table for storing assigned importance levels for tags assigned to a tag grouping, according to one embodiment of the present invention.

In the example of FIG. 2, the dominance or level of importance of the tag groupings 108 are provided according to their visual size. The level of importance can be adjusted by the user. For example, the "genre" tag grouping 108A is larger in size than the "artist" tag grouping 108B. This means that "genre" tags are deemed to play a higher level of importance by the tuner to produce results 106 than the "artist." Likewise, the tags within a tag grouping 108 can also be sized to control the relative level of importance among other tags. FIGS. 3A and 3B illustrate this concept by example. As illustrated in FIG. 3A, the user has selected the "hip-hop" tag 110 within the "genre" tag grouping 108A. Once selected, a sizing ellipse 112 is displayed for the "hip-hop" tag 110 with the current level of importance 113 display. Sizing arrows 114 are also displayed that allow the user to click and drag in the desired direction to expand or shrink the size of the tag 110 to change its level of importance 113. In this example, the level of importance for the "hip-hop" tag 110 is '8' out of a maximum of '10.' If the level of importance is changed by the user by resizing the sizing ellipse 112, the level of importance 113 will also be updated and displayed in kind in the sizing ellipse 112. Selecting a tag grouping 108 may also cause a pop-up window 116 to be displayed to allow the user to add other tags 118 to the tag grouping 108 to be included in the tuner settings. More information about the ability to assign tags to tag groupings 108 and resizing tag groupings and/or the tags within tag groupings to control relative levels of importance in filtering content is described in co-pending and commonly assigned application Ser. No. 11/955,534, filed on Dec. 13, 2007 and entitled "RESIZING TAG REPRESENTATIONS OR TAG GROUP REPRESENTATIONS TO CONTROL RELATIVE IMPORTANCE," which is incorporated herein by reference in its entirety. The tags assigned to a tag grouping as well as their assigned level of importance may be stored in a tag table 119 as part of the tuner settings.

Figure 4:
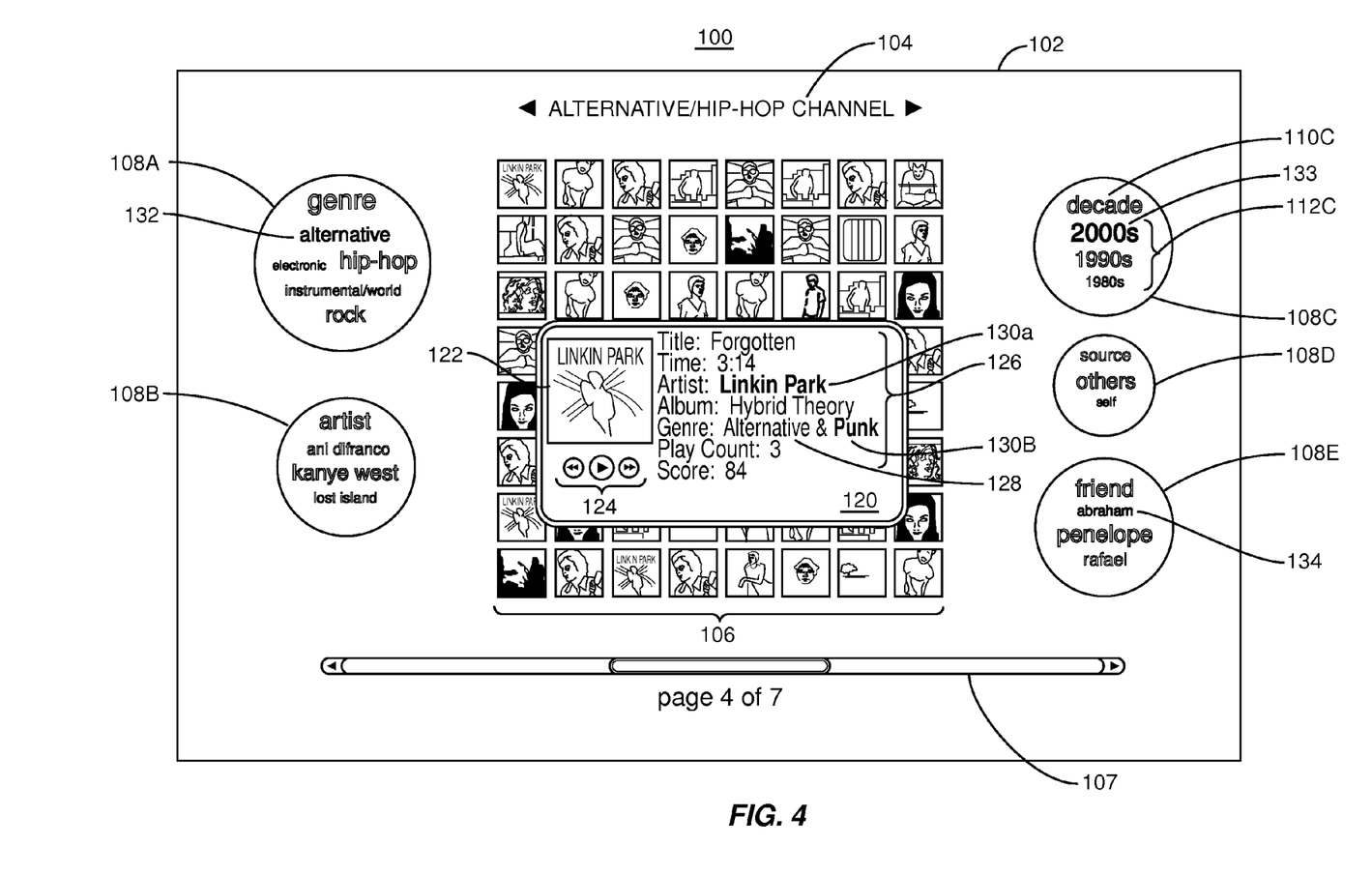
FIG. 4 is a diagram of content results with one of the results being selected by the user and having additional characteristics not employed in the current filter settings, according to one embodiment of the present invention.

After the content results 106 are displayed to the user (step 12 in FIG. 1), the system waits for a selection from the user. The user may select any item of interest among the content results 106 for play or further inspection (step 14). The user can quickly expose more detail about a particular content result 106 by moving a mouse cursor over the icon of the desired result. If the user desires to select a particular content result 106, the user can then click on the icon representing the desired result 106. FIG. 4 illustrates a user display 100 showing an exemplary result 106 selected by the user. In this example, the user has selected the highest scoring song recommendation by clicking at the top left of the results on "Forgotten," by "Linkin Park." In response, a results window 120 is generated to show the user more information about the selection. The album cover 122, play controls 124, and other characteristic information about the result 126 are visually displayed to the user. Some characteristic information about the selected result is already included in the tuner settings. These characteristics of the selection are highlighted in both the results window 120 and the tag groupings 108. For example, the selection illustrated in FIG. 2 is of "alternative" genre 132, was released in the "2000's" decade 133, and was recommended by "Abraham" 134. Highlighting may take the form of a different text color, font, text size, or other visually distinct manner. This provides a convenient visual display to the user of which tuner settings used by the tuner were met by the selected result.

In addition to informing the user of characteristics of the selected result that are included in the tuner settings, any additional characteristics associated with the selected result that are not included in current tuner settings are also highlighted to the user within the characteristic information 126. These are also called unaccounted characteristics, or unaccounted tags in this example. In this example of FIG. 4, the artist name "Linkin Park" 130A and the "punk" genre are highlighted as additional characteristics not presently included in the tuner settings. Thus, if the user wants to further focus the content results 106 to results more closely focused on the characteristics to the selected result, the user can select any of the additional characteristics to be added to the tuner settings (step 16 of FIG. 1). The system will add the unaccounted characteristics to the tuner settings (step 18 of FIG. 1), and the tuner will automatically generate updated results 106 based on the updated tuner settings taking into account the previously unaccounted characteristics selected by the user. In this manner, the user can easily start focusing the results 106 to those more similar to the characteristics of their selected results of interest. Thus, the present invention allows the user to adjust the tuner settings in an iterative manner based on characteristics of content results of interest to the user. This will effectively focus the results 106 to those highly relevant to the user's desires or interest. This is opposed to filtering technologies where the user adjusts the tuner settings not based on characteristics of relevant results, but on other factors. Thus, these other filtering technologies are only as effective as the user's knowledge and skill of the possible characteristics available for filtering. In contrast, the present invention also provides suggestions to the user for additional filtering characteristics based on results the user has deemed relevant to their interests.

Figure 5:
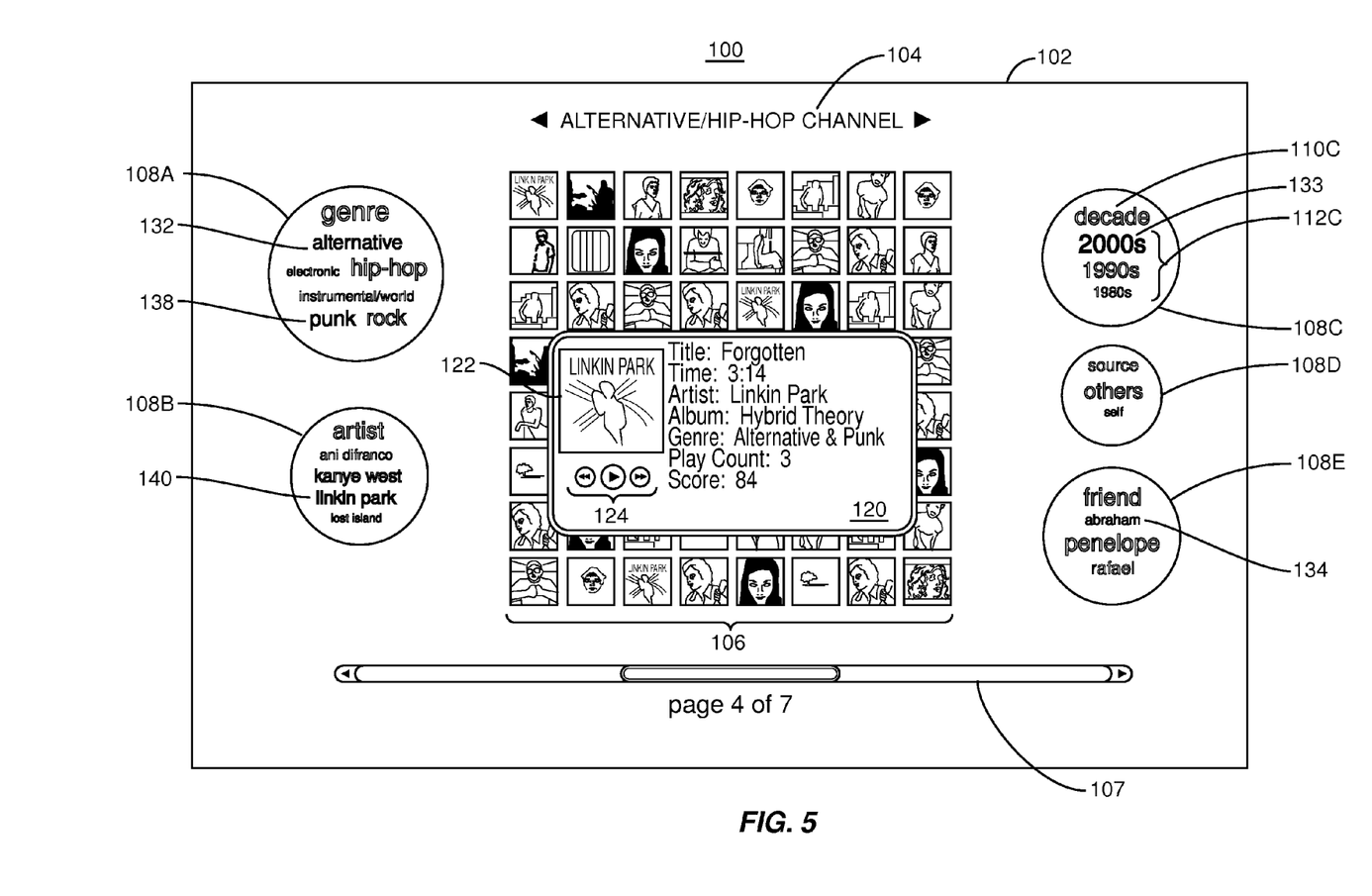
FIG. 5 is an illustration of the content results provided in FIG. 4, with the user having selected additional characteristics from the selected result to be used in the filter settings to produce a new set of content results.

FIG. 5 illustrates an example of the user display 100 after the user has selected previously unaccounted characteristics to be included in the tuner settings causing the tuner to regenerate content results 106 (steps 16 and 18 in FIG. 1). Note that the tag groupings 108 now include the previously unaccounted and user-selected tags of "punk" genre 138 and artist of "Linkin Park" 140. Because these tags are now part of the tuner settings, they are likewise highlighted in the tag groupings 108 as being accounted for and relevant characteristics in the current tuner settings. Once the unaccounted tags are added to the tag groupings 108, the user can resize those tags as well as others, as previously described, to adjust their level of importance in use by the tuner to generate results 106. A default level of importance may be provided until the user resizes tags and/or tag groupings.

Figure 6:
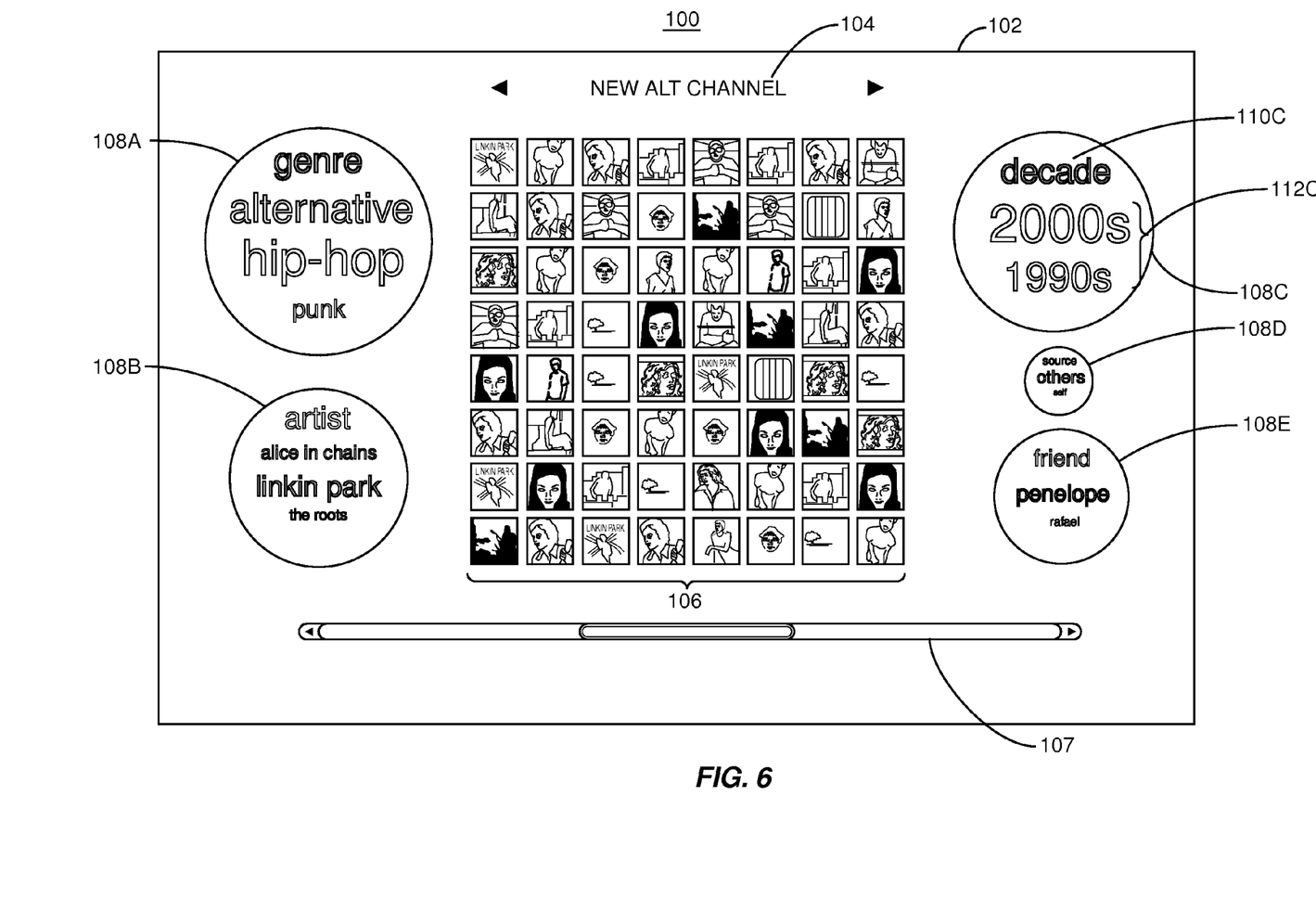
FIG. 6 is an illustration of a new media channel created from content results, according to one embodiment of the present invention.

The process continues by the tuner generating content results 106 based on the user's selection of relevant results 106 and providing adjustments to the tuner settings. These adjustments can include both accounted and unaccounted characteristics in the tuner settings. The user repeats this process in an iterative manner, if desired, until the user is satisfied that the content results 106 are sufficiently focused. If desired, the user can store the tuner settings under a new channel at any time during the iterations (decision 20 in FIG. 1). If a new channel is created, the current tuner settings are stored under the new channel (step 22 in FIG. 1). An example of this is illustrated in FIG. 6, wherein the new channel "New Alt Channel" has been created. In this manner, the user can recall stored tuner settings assigned to the channel that produced the desired content results 106. Once a new channel is created, the process repeats by providing content results 106 according to the tuner settings as the initial results 106. Thus, no tags in the tag groupings 108 will be highlighted for a newly selected channel until a particular result 106 is selected by the user.

In another embodiment, the present invention can also facilitate focusing content results 106 by providing the user additional filtering characteristics that are not assigned to the user-selected content result, but instead are related to the selected content result. This allows the user more options to focus content results based on related interests or goals. In this embodiment, the system provides the related additional characteristics for the user as a measure of assistance instead of the user having to be solely familiar with related characteristics that may be included in updated filter settings.

Figure 7A:
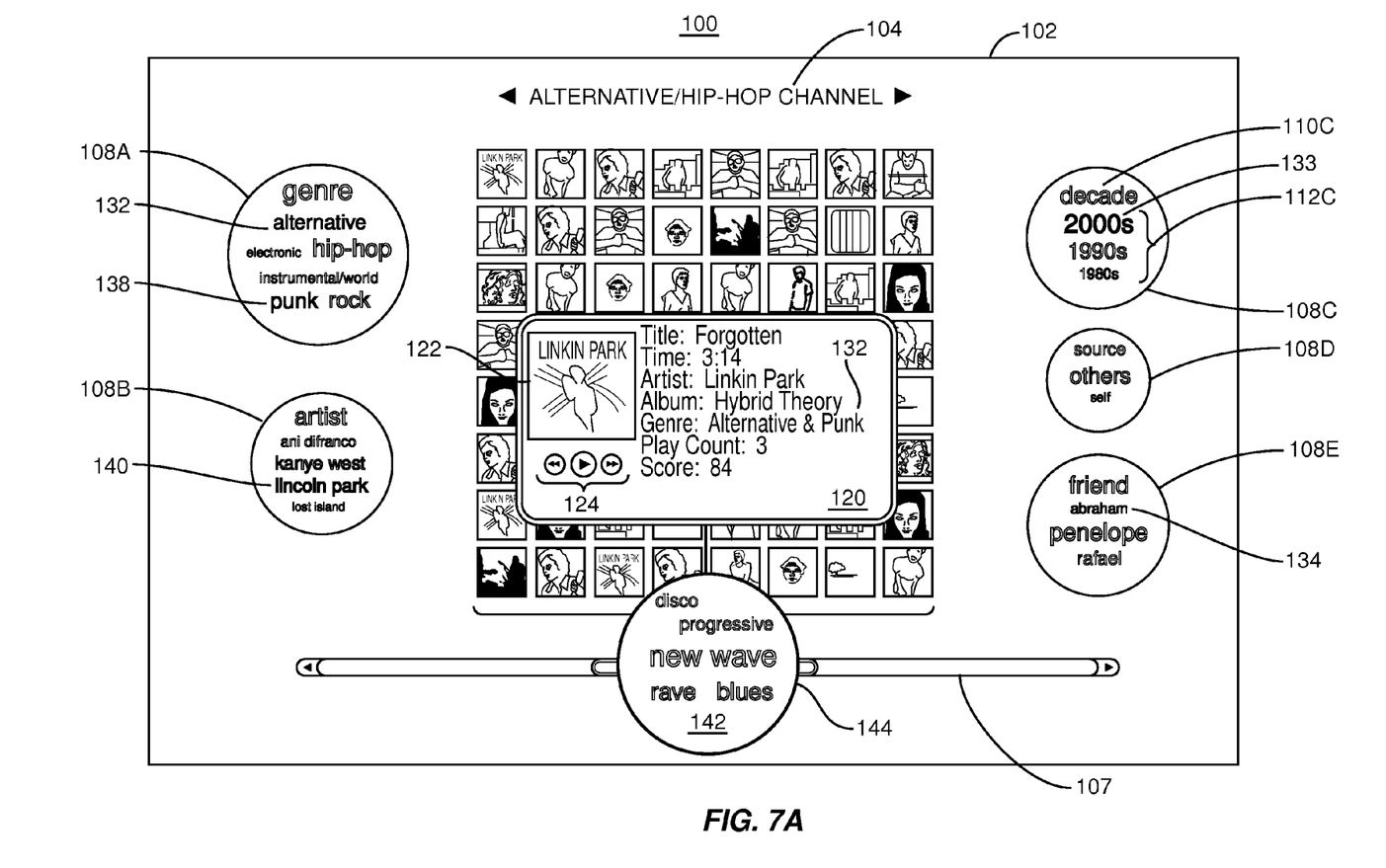
FIG. 7A is an illustration of providing additional related tags related to a user-selected content result that may be selected for inclusion in the filter settings to be used in further generating content results, according to one embodiment of the present invention.
Figure 7B:
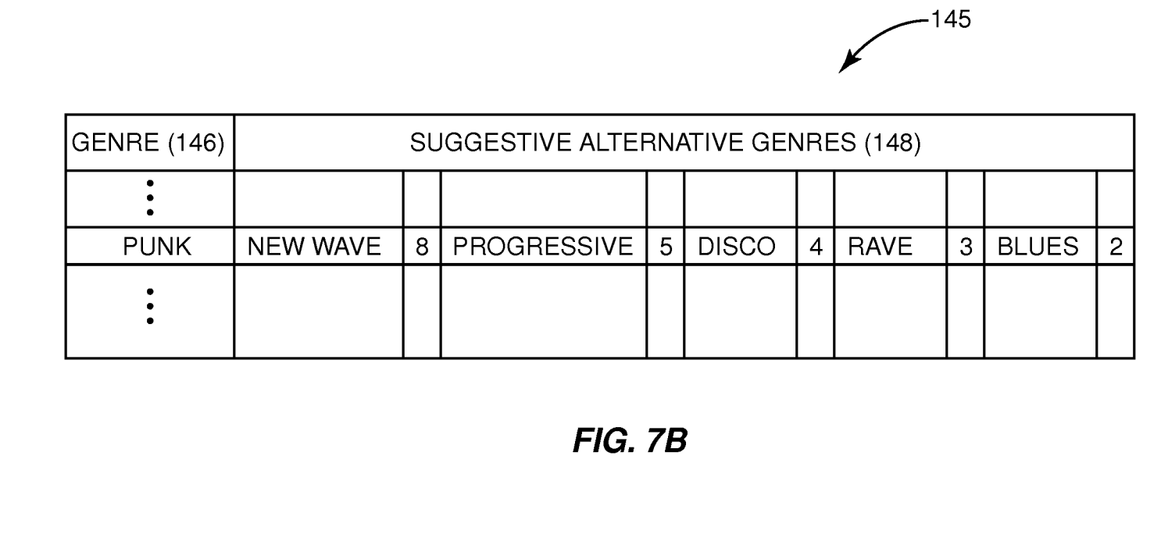
FIG. 7B is a table illustrating the importance level assigned to the additional related tags illustrated in FIG. 7A, according to one embodiment of the present invention.

The additional related filtering characteristics may not be accounted for in either the tuner settings or in the characteristics of the user-selected content result. The user is then free to select any of these additional related filtering characteristics to be included in the tuner settings to have the tuner produce updated content results 106. FIG. 7A illustrates this by example. In this example, the user has selected the song "Forgotten" by "Linkin Park" from the content results 106. However, in this embodiment, the additional related characteristics that are not included in the selected result, but are related to it, are displayed for possible selection. In this example, several different genre types 142 are displayed in an additional related characteristic ellipse 144 for possible selection that are not "alternative" and "punk" genres, but may be closely related to these genre types. The system may have pre-defined settings indicating which additional related characteristics or tags are to be provided and displayed to the user in response to given characteristics of a user-selected content result 106. A table may be provided to store these additional related characteristics like the additional related genre table 145 illustrated in FIG. 7B. In this example, other genres 142 are assigned as being relevant to "punk" genre, with a level of importance or relevance assigned to each. This level of importance controls the sizing of the additional related characteristics when displayed in the additional related characteristic ellipse 144.

Figure 8:
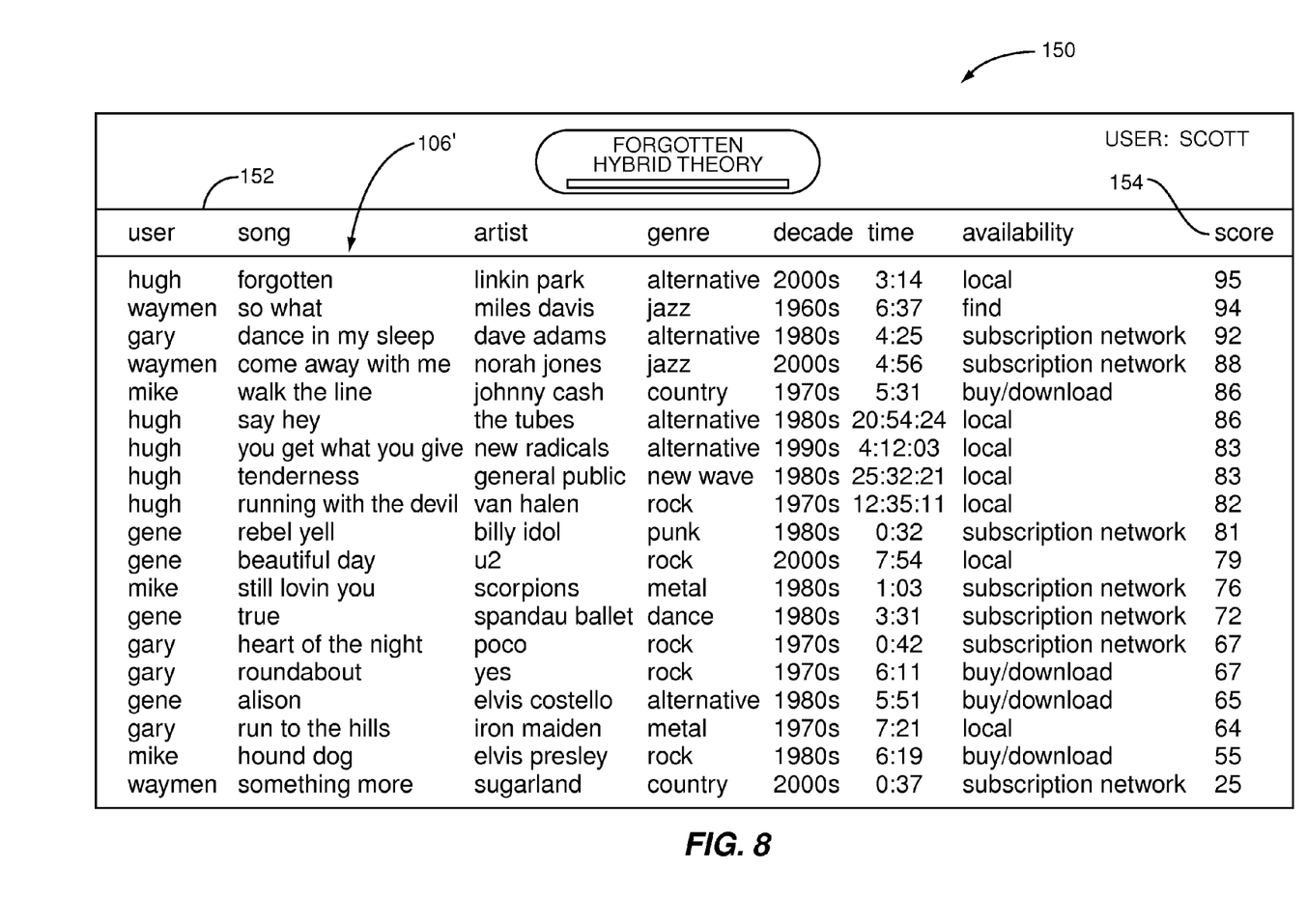
FIG. 8 illustrates an alternative configuration for displaying content results to a user, according to one embodiment of the present invention.

FIG. 8 illustrates an alternative user display 150 for displaying content results to a user. In this example, the content results 106' are provided in list form as opposed to icons. Other characteristics 152 of the results 106' may be displayed in the list. In this example, a score 154 is also associated with each of the results 106'. This score 154 may be used to control the ordering of the initial results set by the tuner in this example. The scoring may be based on any settings or algorithm, including settings based on the user's preferences.

Figure 9:
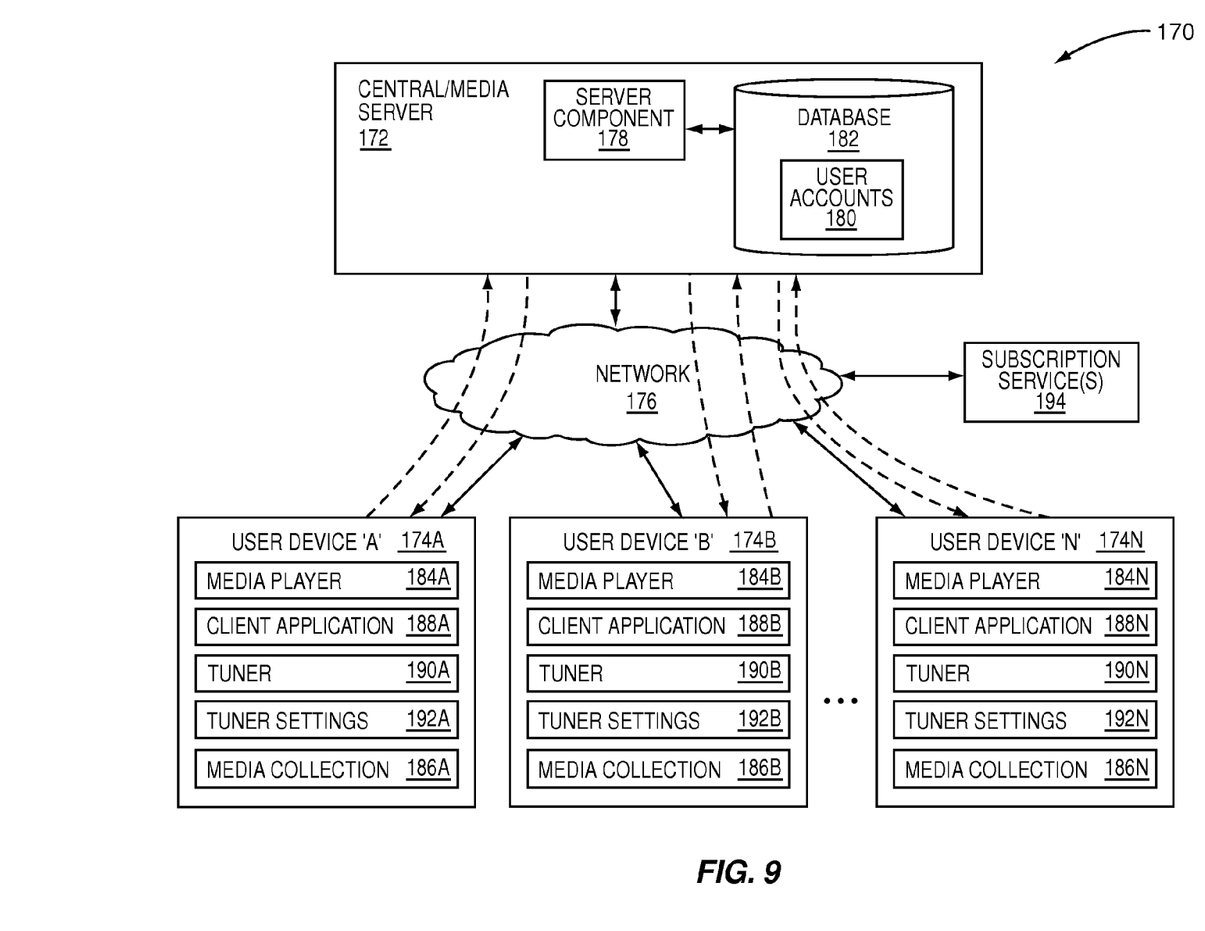
FIG. 9 is an illustration of an exemplary media delivery system that may provide or employ aspects of the present invention.

FIG. 9 illustrates a system diagram of a content delivery and sharing system 170 that may be employed by the present invention to access and filter content. A central server 172 may be provided that provides access to content and other content related services, such as content flow management, to user devices 174 over a network 176. The network 176 may be a wide area network, a local area network, a wired or wireless network, or any other type of network, including but not limited to the Internet. The central server 172 may facilitate providing content services to user devices 174 via a server component 178 that executes to handle requests and provide responses. This also enables users to access and share content in the system 170 and with other peer user devices 174A-174N. The central server 172 may have accessible content stored in a database 182 or may obtain the content from other services, such as subscription-based services 194.

The central server 172 may require the user to have an established user account 180 stored in the database 182 to access content-based services from the central server 172. To establish a user account, users may direct their user device 174 to contact the central server 172, and namely the server component 178 within the central server 172. The server component 178 may store user account and associated information in a record of user accounts 180 in the database 182 within or accessible to the central server 172.

The user devices 174 may contain a media player 184 to allow a user to play media content and content results, including songs and/or video presentations for example. The user device 174 may also contain a tuner 190 to provide the results 106, 106' to a user at the user device 174 as previously described. The user device 174 may also contain tuner settings 192 locally to be used by the tuner 190 to provide content results to the user. Alternatively, the tuner settings may be stored remotely, such as at the central server 172 under the user's account, or elsewhere that is network accessible. The tuner settings 192 may be predefined user preferences or settings, or may be any other type of settings or algorithms for allowing the tuner 190 to filter and provide content results.

The user device 174 may also have media content stored locally in a user's media collection 186. The tuner 190 may access the media collection 186 to provide content results. If the desired media content is not stored locally, the tuner 190 may also be adapted to access other systems to obtain desired media content. In this regard, the user device 174 may request media content from the subscription service 194, or from the central server 172.

Further, in order to access media-based services from the central server 172, users may be required to download a client application 188 to their user device 174 from the central server 172. The client application 188 provides software to allow the user devices 174 to communicate with the central server 172 to access media-based services and related information. For example, a user device 174 may contact the central server 172, via the client application 188, to request certain media content. The central server 172 may provide the requested media content from its database 182 if present, or may access an outside service, such as the subscription service 194 for example, to access the requested media content.

The client application 188 may also facilitate the user devices 174 sending and receiving media recommendations to and from other peer user devices 174 in the system 170 as described in application Ser. No. 11/484,130, previously referenced above. A user may desire to recommend a given media content to a friend. In this instance, the user, acting as a recommender, instructs their user device 174 to send a recommendation for the desired media content to a recipient user's device 174. This instruction may be performed by the recommender user manually or automatically as a result of the recommender playing a given media content. The recommender user may have a pre-defined list of friends that will be sent recommendations for media content once played by the recommender user. In either case, the media recommendation is sent over the network 176 to the central server 172. The central server 172 intercepts the media recommendations and forwards it to the recipient's user device 174. There, the recipient's user device 174 may place the media recommendation in a media queue, which may be a playlist for example, so that the recipient user's device 174 can access, display, and/or play the recommended media content. The media queue may contain an ordered list of media content scheduled to be played by the user device 174. The order of placement of the received media recommendation in the media queue may be controlled by a scoring algorithm. The scoring algorithm may be controlled or influenced by the tuner settings 192. The tuner settings 192 may include preferences based on media attributes, or may be based on other information including the identity of the recommender, as examples.

It should be noted that the present invention is not limited to filtering or tuning of audio or video media. The present invention may be used to filter or tune any type of content. The present invention may be used in any type of filtering technology. This includes search engines, including those on the Internet to search content available through the world wide web. The filter or tuner employed by the present invention may be located at a user device or at another device, including but not limited to a central server. Further, the filter or tuner settings may likewise be located at a user device or at another device, including but not limited to a central server. If located at other devices other than a user device, the tuner may operation in conjunction with a user device to display results to the user and receive a user's selections regarding filtering characteristics and tuning channels.

Those skilled in the art will recognize improvements and modifications to the preferred embodiments of the present invention. All such improvements and modifications are considered within the scope of the concepts disclosed herein and the claims that follow.

What is claimed is:

1. A method for filtering content, comprising the steps of:
generating first content results based on first filter settings applied to a source of content;
receiving a selection of content from a user device from among the first content results;
in response to receipt of the selection, generating a suggestive characteristic associated with the selected content and unaccounted for in the first filter settings applied to the source of content;
providing the suggestive characteristic to the user device;
receiving a selection of the suggestive characteristic from the user device;
in response to receipt of the selection, adding the suggestive characteristic received from the user device to the first filter settings to provide second filter settings, wherein at least one of the first filter settings and the second filter settings comprise a tag grouping including a tag defining a characteristic of content;
assigning a level of importance to the tag in the tag grouping in at least one of the first filter settings and the second filter settings to control the relative level of importance of the tag among tags in the at least one of the first filter settings and the second filter settings; and
generating second content results based on the second filter settings applied to the source of content.

2. The method of claim 1 further comprising assigning a level of importance to the tag grouping in at least one of the first filter settings and the second filter settings to control the level of importance of the tag grouping in the at least one of the first filter settings and the second filter settings.

3. The method of claim 1, further comprising displaying the new content results to the user at the user device.

4. The method of claim 1, further comprising creating a channel based on the updated filter settings.

5. The method of claim 1, wherein generating content results based on filter settings being applied to a source of content comprises generating content results based on tuner settings being applied to a source of content.

6. The method of claim 1, further comprising:
providing at least one additional characteristic relating to the at least one suggestive characteristic to the user and that was unaccounted for in the at least one suggestive characteristic;
receiving a selection from the user of the at least one additional characteristic;

including the at least one additional characteristic selected by the user in the filter settings to provide updated filter settings; and generating new content results based on the updated filter settings being applied to the source of content.

7. The method of claim 6, wherein the at least one additional characteristic was unaccounted for in the filter settings.

8. The method of claim 1, further comprising:
receiving a selection from the user of at least one filter characteristic not associated with content selection; and
including the at least one filter characteristic not associated with the content selection in the filter settings to provide updated filter settings.

9. The method of claim 1, further comprising:
displaying the filter settings to the user; and
displaying the at least one suggestive characteristic in a visually distinct manner from the filter settings.

10. The method of claim 1, wherein at least the steps of generating first content results, generating and providing the suggestive characteristic, adding the suggested characteristic, and generating new content results are performed by a central server located apart from the user device.

11. A device for filtering content, comprising:
a tuner coupled to a source of content, wherein the tuner is adapted to:
generating first content results based on first filter settings applied to a source of content;
receiving a selection of content from a user device from among the first content results;
in response to receipt of the selection, generating a suggestive characteristic associated with the selected content and unaccounted for in the first filter settings applied to the source of content;
providing the suggestive characteristic to the user device;
receiving a selection of the suggestive characteristic from the user device;
in response to receipt of the selection, adding the suggestive characteristic received from the user device to the first filter settings to provide second filter settings, wherein at least one of the first filter settings and the second filter settings comprise a tag grouping including a tag defining a characteristic of content;
assigning a level of importance to the tag in the tag grouping in at least one of the first filter settings and the second filter settings to control the level of relative importance of the tag among tags in the at least one of the first filter settings and the second filter settings; and
generating second content results based on the second filter settings applied to the source of content.

12. The device of claim 11, wherein the tuner is further adapted to display the new content results to the user.

13. The device of claim 11, wherein the tuner is further adapted to repeat actions (b) through (f) in an iterative manner.

14. The device of claim 11, wherein the tuner is further adapted to create a channel based on the updated tuner settings.

15. The device of claim 11, wherein the source of content is comprised from a group consisting of audio media, video media, and audio and video media.

16. The device of claim 11, wherein the tuner settings comprise at least one tag defining a characteristic of content.

17. The device of claim 16, wherein the tuner is further adapted to assign a level of importance to the at least one tag in the tuner settings to control the level of importance of the at least one tag in the tuner settings.

18. The device of claim 11, wherein the tuner settings comprises at least one tag grouping comprised of at least one tag defining a characteristic of content.

19. The device of claim 18, wherein the tuner is further adapted to assign a level of importance to the at least one tag grouping in the tuner settings to control the level of importance of the at least one tag grouping in the tuner settings.

20. The device of claim 11, further wherein the tuner is further adapted to:
provide at least one additional characteristic relating to the at least one suggestive characteristic to the user and that was unaccounted for in the at least one suggestive characteristic;
receive a selection from the user of the at least one additional characteristic;
include the at least one additional characteristic selected by the user in the tuner settings to provide updated tuner settings; and
generate new content results based on the updated tuner settings being applied to the source of content.

21. The device of claim 11, wherein the tuner is further adapted to:
receive a selection from the user of at least one filter characteristic not associated with the content selection; and
include the at least one filter characteristic not associated with the content selection in the tuner settings to provide updated tuner settings.

22. The device of claim 11, wherein the tuner is further adapted to:
display the tuner settings to the user; and
display the at least one suggestive characteristic in a visually distinct manner from the tuner settings.

23. A non-transitory computer readable medium comprising instructions for instructing a computer to:
generating first content results based on first filter settings applied to a source of content;
receiving a selection of content from a user device from among the first content results;
in response to receipt of the selection, generating a suggestive characteristic associated with the selected content and unaccounted for in the first filter settings applied to the source of content;
providing the suggestive characteristic to the user device;
receiving a selection of the suggestive characteristic from the user device;
in response to receipt of the selection, adding the suggestive characteristic received from the user device to the first filter settings to provide second filter settings, wherein at least one of the first filter settings and the second filter settings comprise a tag grouping including a tag defining a characteristic of content;
assigning a level of importance to the tag in the tag grouping in at least one of the first filter settings and the second filter settings to control the relative level of importance of the tag among tags in the at least one of the first filter settings and the second filter settings; and
generating second content results based on the second filter settings applied to the source of content.

* * * * *